Sept. 3, 1968 J. W. HORTON 3,400,273

TWO DIMENSIONAL RADIATION SCANNER LOCATING POSITION BY THE TIME IT TAKES A GROUP OF MINORITY CARRIERS TO REACH A TERMINAL OF THE DEVICE

Filed Sept. 2, 1964 3 Sheets-Sheet 1

INVENTOR.
JOHN W. HORTON

BY

John J. Goodwin

ATTORNEY

Sept. 3, 1968 J. W. HORTON 3,400,273

TWO DIMENSIONAL RADIATION SCANNER LOCATING POSITION BY THE TIME IT TAKES A GROUP OF MINORITY CARRIERS TO REACH A TERMINAL OF THE DEVICE

Filed Sept. 2, 1964 3 Sheets-Sheet 2

Sept. 3, 1968 J. W. HORTON 3,400,273

TWO DIMENSIONAL RADIATION SCANNER LOCATING POSITION
BY THE TIME IT TAKES A GROUP OF MINORITY
CARRIERS TO REACH A TERMINAL
OF THE DEVICE

Filed Sept. 2, 1964 3 Sheets-Sheet 3

United States Patent Office 3,400,273
Patented Sept. 3, 1968

3,400,273

TWO DIMENSIONAL RADIATION SCANNER LOCATING POSITION BY THE TIME IT TAKES A GROUP OF MINORITY CARRIERS TO REACH A TERMINAL OF THE DEVICE

John W. Horton, New York, N.Y., assignor to International Business Machines Corporation, New York, N.Y., a corporation of New York Filed Sept. 2, 1964, Ser. No. 393,995
17 Claims. (Cl. 250—211)

ABSTRACT OF THE DISCLOSURE

A two dimensional radiation scanner is disclosed which is responsive to patterns of radiant energy and produces electrical signals representative of the radiant energy. The device consists of a square or rectangular slab of semiconductor material, for example, semiconductor material of the N type. An ohmic contact is located along each of two opposite ends of the slab. A waveform generator is connected across the ohmic contacts.

When radiant energy is directed to one or more points on the slab, packets of minority carriers are produced. The waveform generator connected across the ohmic contacts produces a sequence of pulses which cause the packets of minority carriers to be driven through the slab of semiconductor material to one of the ohmic contacts at the end of the slab. The minority carriers will arrive at the ohmic contact at a time representative to the distance between the ohmic contact and the point at which the radiant energy impinged on the slab.

The minority carriers are detected at the end of the slab and the timed relationship within which the minority carriers are detected produces electrical signals representative of the positional information of the radiant energy on the slab. The minority carriers are detected by a scanning circuit consisting of a relatively narrow slab of P type semiconductor material joined to the N type slab along one end of the slab beneath the ohmic contact. Another relatively narrow slab of N type semiconductor material is joined to the aforesaid P type forming at the region of the slab proximate to the ohmic contact an NPN junction.

A battery is connected across the NPN junction to provide a voltage gradient across the junction which is maximum at one end and minimum at the other end of the junction. The voltage gradient back-biases the junction. A ramp signal is also connected across the NPN junction which forward biases the junction in sequence from one end to the other. As the junction is forward biased, the minority carriers are detected and produce an output signal.

In copending U.S. patent application, Ser. No. 279,531, now Patent No. 3,317,733 filed May 10, 1963, and assigned to the present assignee, a unique radiation scanner is described which includes three layers of semiconductor material; an intermediate and two outer layers. The intermediate layer is joined to both outer layers throughout the length thereof and the materials of the layers are selected to form an elongated asymmetrically conductive semiconductor junction at each of the joints, the junctions having oppositely poled asymmetry. At least one of the junctions is conductive in response to received radiation, and at least one of the outer layers has electrical connections at laterally spaced positions thereon and arranged for connection to sources of different bias voltage levels. The other outer layer has at least one electrical connection arranged to be connected to a source of another bias voltage level. A source of ramp or sweep voltage difference is applied between the outer layers, and a detector is connected in a circuit between the outer layers for detecting functions of the current between the outer layers. When a spot or slit of light is directed on the outer layer associated with the photoresponsive diode a photocurrent is produced. The photocurrent is not detected, however, until the ramp voltage "reaches" the point where the charge is located. This is because the junction between the top and middle layers is slightly forward biased and the ramp voltage produces a progressive back-bias along the length of the scanner. An output pulse is then generated, the occurrence of which with respect to the ramp voltage amplitude indicates the location of the light. Stated another way, a voltage gradient between the two outer layers is applied across the length of the scanner. This voltage gradient prevents the photocurrent produced by the light from flowing. A scan voltage is applied across the scanner which overcomes the gradient and permits the photocurrent to flow. The amplitude of the scan voltage is representative of the amplitude of the voltage gradient at the location of the light and consequently also representative of the location of the light.

The described device is capable of providing the location of radiation in only one dimension, that is, along the length of the scanner.

Accordingly, it is an object of the present invention to provide a radiation scanner which produces two-dimensional output signals.

Another object of the present invention is to provide a radiation scanner for producing output signals representative of the location of radiation spots, lines and patterns on a semiconductor surface.

The foregoing and other objects, features and advantages of the invention will be apparent from the following more particular description of preferred embodiments of the invention, as illustrated in the drawings.

Figure 1:
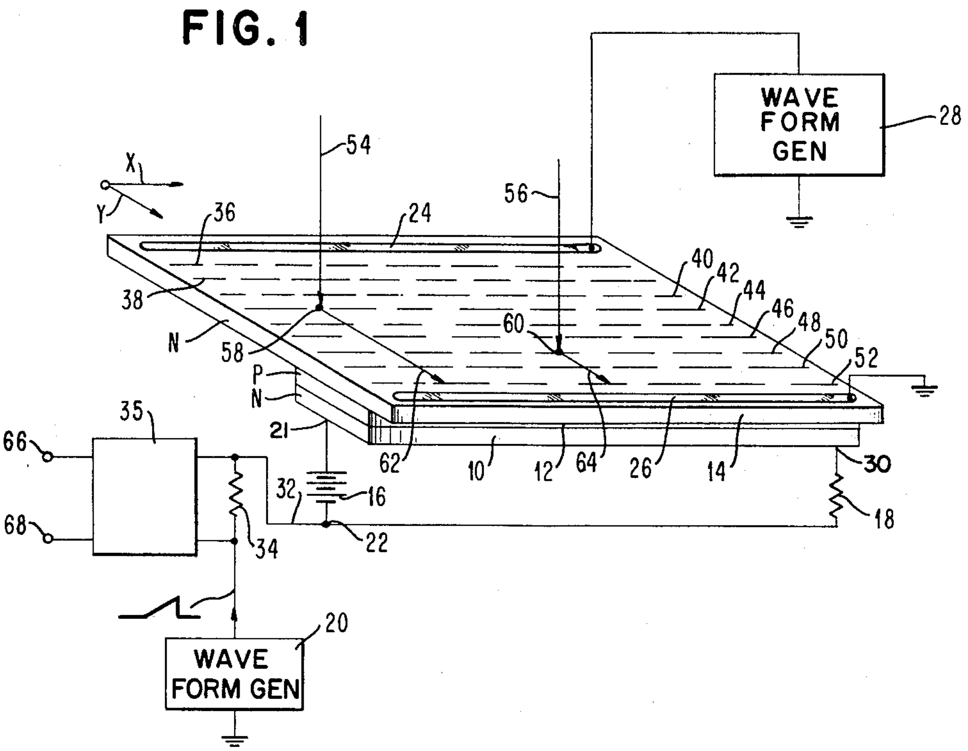
FIG. 1 is an embodiment of a two dimensional radiation scanner following the principles of the present invention.

In FIG. 1 the basic elements of a single dimension scanner as described in the copending application, Ser. No. 279,531, is shown including a lower semiconductor layer 10 of N conductivity, a middle semiconductor layer 12 of P conductivity, and an upper semiconductor layer 14 of N conductivity. The lower layer 10 is biased by a D.C. source 16 at one end and terminal 21 is connected to the other end at terminal 30 through a resistor 18. This lower layer 10 serves as a resistive voltage divider. A waveform generator 20 is connected to the layer 10 at a point 22. Waveform generator 20 produces a ramp or sweep voltage. The scanner of FIG. 1 is distinct from the scanner shown in copending application, Ser. No. 279,531, in that the upper layer 14 is extended in a direction transverse to the length of the scanner. Henceforth, the linear direction of layers 10 and 12 will be referred to as the X direction and the extended direction of the upper layer 14 will be referred to as the Y direction.

A further distinction is that ohmic contacts 24 and 26 are coupled to the extreme ends of upper layer 14 in the Y direction.

A second waveform generator 28 is connected to ohmic contact 24. Generator 20 will be referred to as the X generator and generator 28 will be referred to as the Y generator. In operation, the scanner of FIG. 1 is scanned in the Y direction and in the X direction such that the location of a point source of light or other radiant energy directed on the surface of layer 14 can be determined.

The operation of the Y scanning mode is based on the semiconductor property that minority carriers are created in doped semiconductor material at the point where a beam of radiation is directed thereon. The beam of radiation excites hole-electron pairs in the semiconductor and releases a localized packet of minority carriers at the radiation input point. These minority carriers persist long enough to be driven through the semiconductor material by means of a voltage gradient to a collector junction which is a distance away from the radiation input point. The minority carriers, upon reaching the collector junction, produce a pulse of current. A voltage of a given amplitude which is applied for a given time period will drive the minority carriers a given distance. A plurality of separate voltage pulses of separate amplitudes which are each applied for the same time period will drive minority carriers from separate points in the semiconductor to the same given point.

In FIG. 1, minority carriers will be produced in the semiconductor layer 14 at the point or points where radiant energy is directed thereon. When a proper potential is applied between collectors 24 and 26 by means of waveform generator 28, the minority carriers are all swept across the layer 14 toward collector 26. Thus, toward the end of the Y direction scan, at some given time, minority carriers will be present proximate to collector 26 and above the middle layer 12. The junction between layers 12 and 14 is slightly forward biased so that the minority carriers persist until scanned by the X voltage.

At this time the X direction scan is commenced. The X direction scan operates in a manner described in the aforesaid copending patent application, Ser. No. 279,531. A sweep signal is applied across layers 10, 12, and 14 in the X direction. At the point where the minority carriers are present an abrupt current change occurs in lead 32 which is coupled via the resistor 34 through detection circuit 35 to output terminals 66 and 68 as an output signal. Detection circuit 35 may include a filter for smoothing and filtering out undesired frequency components. The timing relationships between waveform generator 28, waveform generator 20, and the occurrence of the transient current pulse will determine the location of the light spot.

Figure 2:
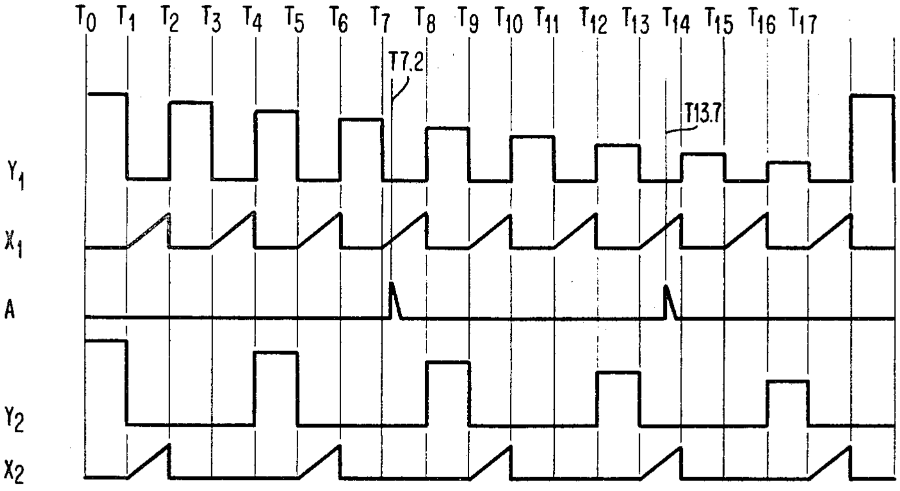
FIG. 2 is a series of waveforms useful in explaining the operation of the present invention.

A more detailed explanation of the scanner of FIG. 1 will be provided with reference to the waveforms of FIG. 2. In FIG. 2 the waveform designated Y represents the output of waveform generator 28. It is seen that the Y scan consists of a series of pulses, with each successive pulse being lower in amplitude than the preceding pulse. The series of decreasing amplitude pulses are repetitive, with nine pulses per series being shown in FIG. 2 by way of an example. Referring to FIG. 1, the surface of upper layer 14 is schematically separated into scan lines designated by the dotted lines 36, 38, 40, 42, 44, 46, 48, 50, and 52. Beams of radiant energy are represented by arrows 54 and 56 and fall on upper layer 14 at points 58 and 60 respectively. Thus, minority carriers are generated at points 58 and 60 in semiconductor layer 14.

The first required operation is that of sweeping the minority carriers at points 58 and 60 toward contact 26 in a manner such that the Y distance between point 60 and contact 22 may be determined.

It is known that separate and discrete lines of a semiconductor body may be scanned and minority carriers located at points along the line can be driven to a collector thereby. Consider U.S. Patent 3,111,556 to J. Knoll et al, entitled "Image Pickup Devices and Scanning Circuits Therefor," issued Nov. 19, 1963 and assigned to Servo Corporation of America. In this patent, particularly FIG. 5 thereof, a semiconductor body is shown having vertical scan contacts connected at either end and a scan voltage applied across the contacts in the form of a series of scan pulses. The first of the scan pulses has the largest amplitude and scans a line across the semiconductor body closest to one of the vertical contacts. The next scan pulses is of slightly less amplitude and scans a line slightly further from the vertical contact. A series of repetitive pulses, each having a lesser amplitude than the preceding pulse, such as shown at (B) in FIG. 5 of U.S. Patent 3,111,556, will serve to scan the entire semiconductor surface and cause the minority carriers at given locations in the semiconductor to be driven to the end conductor.

In FIG. 2 of the present drawings an example of the Y pulses from pulse generator 28 are shown in waveform $Y_1$. The first Y pulse is maximum and will drive any minority carriers along the line 36 (FIG. 1) to conductor 26. The second Y pulse of lesser amplitude will drive any minority carriers along line 38 to conductor 26, and so on until the smallest Y pulse which drives any minority carriers along line 52 to conductor 26. The entire layer 14 being scanned, the Y scan is repeated. The amplitudes and duration time of the Y pulses are determined as a function of the dimensions and composition of layer 14.

After each Y pulse the X ramp scan is commenced as shown in waveform $X_1$ of FIG. 2.

It is noted in waveform $X_2$ of FIG. 2 that the X scan from waveform generator 20 (FIG. 1) is synchronized with the Y scan of waveform generator 28 (FIG. 1) such that the X scan ramp signal begins at the end of each Y pulse and ends at the beginning of each Y pulse. The X ramp scan is functionally the same as the sweep signal described in copending application, Ser. No. 279,531. At the end of each Y pulse, any minority carriers driven by the pulse will be located in semiconductor layer 14 just above layers 12 and 10. The minority carriers will also be located between terminals 21 and 30 in the same relative X distance as at their point of generation. For example, the minority carriers produced at point 58 by the radiation beam 54 will be driven to a point proximate to contact 26 as indicated by arrow 62, and the minority carriers produced at point 60 by radiation beam 56 will be driven to a point proximate to contact 26 as indicated by arrow 64. The X position of the minority carriers is then determined by the X scan signal from waveform generator 20

A more detailed explanation of the X and Y scan will be given using as an example the minority carriers produced by radiation beams 54 and 56. Referring to FIG. 2, the first Y pulse occurring between $t_0$ and $t_1$ drives any minority carriers located along the line 36 across the layer 14 to a point above layers 10 and 12. The X scan between $t_1$ and $t_2$ then sweeps the three layers 10, 12, and 14. If minority carriers were present along line 36 (which they are not) a pulse would result at the appropriate point along the X scan. The Y scan between $t_2$ and $t_3$ drives any minority carriers along line 38 to a point above layers 10 and 12 and the three layers 10, 12 and 14 are scanned between $t_3$ and $t_4$ by the X ramp. No output pulse is produced since there were no minority carriers present along line 38.

This operation continues until the fourth Y pulse occurs between $t_6$ and $t_7$, at which time the minority carriers produced by radiation beam 54 at point 58 are driven to a point above layers 10 and 12 as indicaed by the arrow 62. At the $t_7$ the X scan begins to sweep the layers 10, 12, and 14. The X scan biases the photodiode pairs formed by the semiconductor junctions between layers 10, 12, and 14 in a progressive manner between terminals 22 and 30 as the amplitude of the X scan increases. A pulse is produced at the point where the minority carriers are located (i.e., at the head of arrow 62) at the associated point of the time base of the X scan. This pulse produces an output signal across terminals 66 and 68. The ouput signal appearing across terminals 66 and 68 is represented by waveform A in FIG 2.

Consider that the upper semiconductor layer 14 is 9 mm. long in the Y direction and 10 mm. long in the X direction. In FIG. 2 the nine Y pulses scan a separate one of nine lines 36, 38, 40, 42, 44, 46, 48, 50, and 52 which are spaced 1 mm. apart. Thus, when an output pulse was produced at terminals 66 and 68 after the fourth Y pulse as shown in waveform A, it was indicative that a radiation beam entered the upper layer 14 at a point 4 mm. from contact 24. Presume also that beam 54 strikes layer 14 at a point (58) which is 2 mm. from the left edge of the layer. The X scan pulse between $t_7$ and $t_8$ scans the 10 mm. X dimension of the layer. Since the minority carriers are located 2 mm. from the left edge of the layer, a pulse is produced at a time two-tenths of the entire scan as shown in waveform A. Thus, a pulse is produced at a time $t_{7.2}$. The fact that the pulse occurred between $t_7$ and $t_8$ indicates that it was driven by the fourth Y pulse and therefore the Y distance is 4 mm. The fact that the pulse occurred after two-tenths of the X scan between $t_7$ and $t_8$ had elapsed indicates that the X distance is 2 mm.

The fifth and sixth Y pulses will occur with no effect on the output since there are no minority carriers being generated along lines 44 and 46. The seventh Y pulse occurring between times $t_{12}$ and $t_{13}$ will sweep the minority carriers generated at point 60 by radiation beam 56 to the edge of layer 14 as indicated by arrow 64. Between $t_{13}$ and $t_{14}$ the X scan is applied across terminals 22 and 30 and an output pulse is produced at time $t_{13.7}$. Since the output pulse occurred between times $t_{13}$ and $t_{14}$ (after the seventh Y pulse) it follows that the Y coordinate of point 60 is 7 mm. The fact that the output pulse occurred at seven-tenths the duration of the X scan indicates that the X coordinate of point 50 is 7 mm.

It is seen therefore that any point on the surface of layer 14 may be scanned and that the coordinates of minority carriers produced by radiation at such point can be determined. In the above example a 9 mm. layer long was discussed having nine Y pulses per total Y scan. This is for explanation only, and it has been calculated that a layer 1 cm. long having 100 scan lines (i.e., 100 Y pulses per total Y scan) is possible. Thus, the resolution of the scan would be superior to the nine line scan described.

Figure 3:
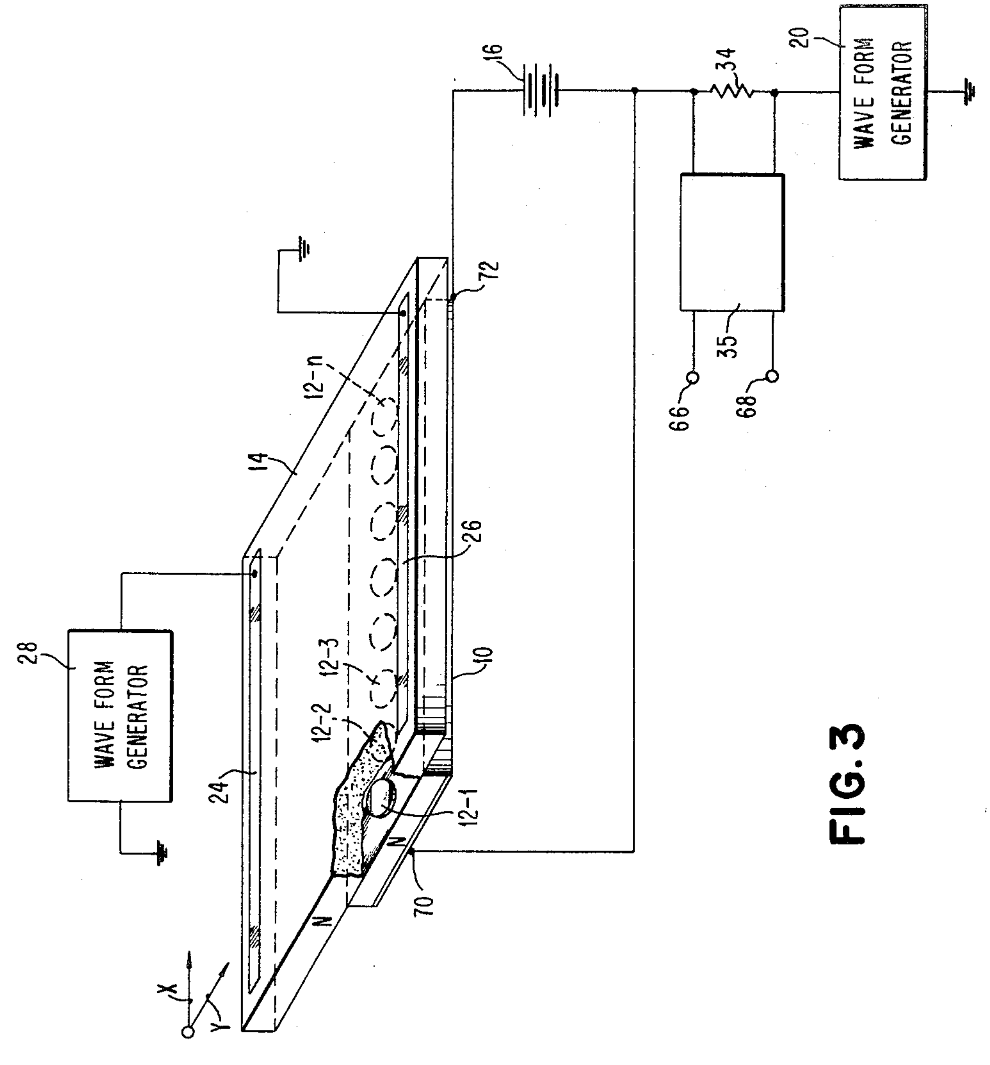
FIG. 3 is another embodiment of a two dimensional scanner following the principles of the present invention.

Another embodiment of the present invention is shown in FIG. 3. The operation of the scanner of FIG. 3 is essentially the same as in FIG. 1, however, the middle P-type semiconductor layer 12 of FIG. 1 is replaced by a plurality of separate dots 12–1, 12–2, 12–3 . . . **12–*n* of P-type semiconductor material which form PN junctions with the top N layer 14 and the bottom N layer 10. A section of the upper layer 14 is shown broken to more clearly illustrate semiconductor dot 12–1**.

Also different in FIG. 3 is the manner of connecting the waveform generator 20. Waveform generator 20 in FIG. 3 is connected with battery 16 to the lower layer 10 via ohmic contacts 70 and 72. Electrically, it makes no difference whether the waveform generator 20 is connected to the scanner as shown in FIG. 1 or FIG. 3. The operation of the scanner of FIG. 3 is essentially the same as the scanner of FIG. 1. The upper layer 14 is scanned line by line in the Y direction by waveform generator 28, and after each line is scanned the three layer portion, layers 10 and 14 and the layer of dots 12–1 through **12–*n* is scanned in the X direction by the application of the X ramp signal from waveform generator 20. The X and Y coordinates of any radiant beam falling on upper layer 14 will be determined by which Y pulse precedes an output pulse and by the relative time of the occurrence of the output pulse with respect to the time base of the X scan pulse. The Y scan signal from waveform generator 28 and the X scan signal from waveform generator 20 are as depicted by waveforms $Y_1$ and $X_1$ in FIG. 2. The difference in FIG. 3 is that as X the scan signal is applied between contacts 70 and 72 the scan is in sequence from dot 12–1 through dot 12–*n*** rather than continuous as in FIG. 1.

Figure 4:
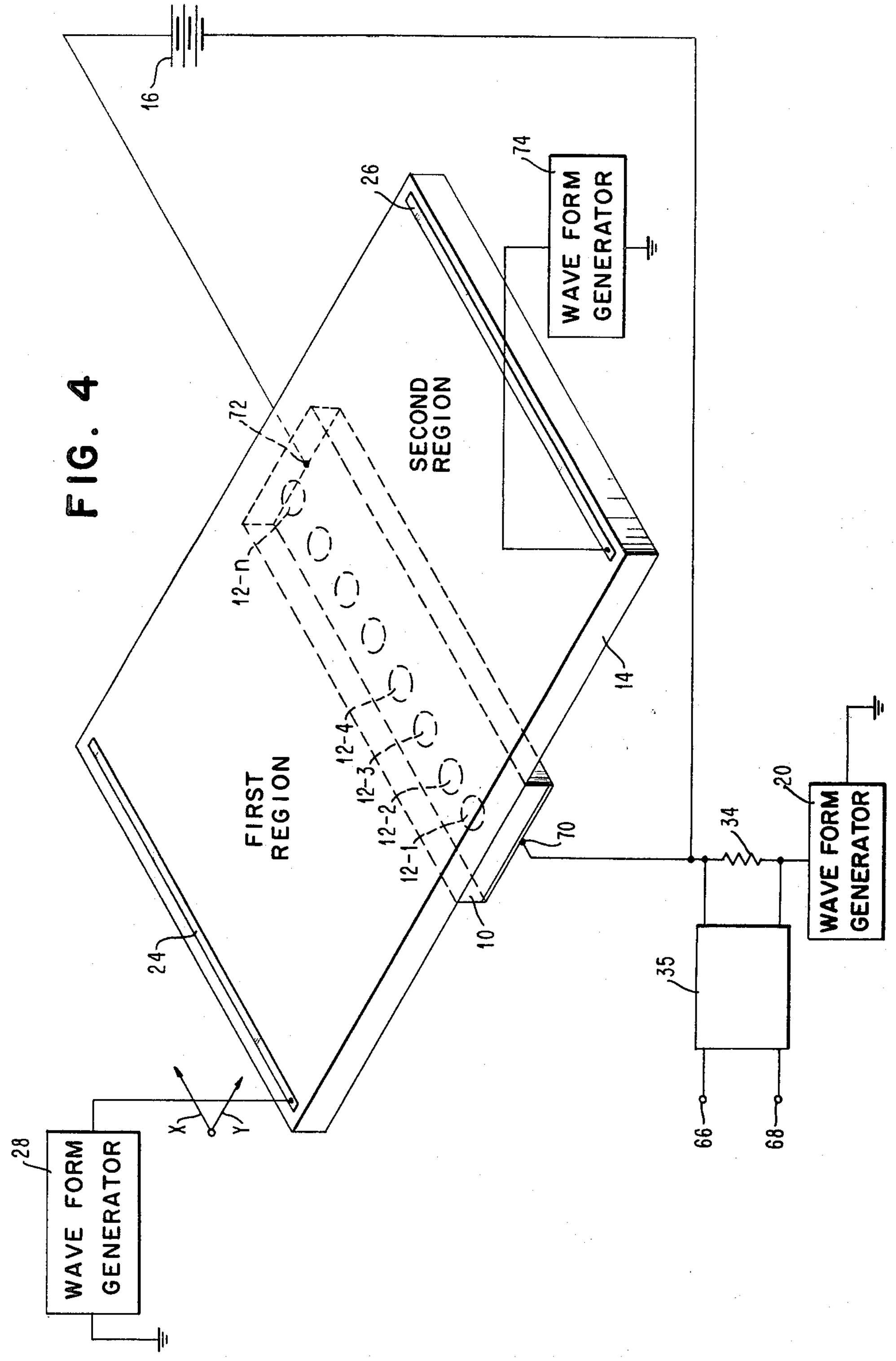
FIG. 4 is still another embodiment of a two dimensional scanner following the principles of the present invention.

A further configuration of the present scanner is shown in FIG. 4. In FIG. 4 the upper layer 14 has been extended so that the lower layer 10 is equidistant between the ends thereof. The center semiconductor portion may be either a solid layer as shown by layer 12 in FIG. 1 or a series of separate semiconductor dots as shown by dots 12–1 through **12–*n* in FIG 3. In FIG. 4 the center region is shown as dots 12–1 through 12–*n***.

The X waveform generator 20 and the battery 16 are connected across layer 10 via ohmic contacts 70 and 72 in a manner identical to FIG. 3. In addition to the usual Y waveform generator 28 being connected to ohmic contact 24, a second Y waveform generator 74 is connected to the other ohmic contact 26 on the portion of layer 14 which has been extended. In the embodiment of FIG. 4 the X scan mode is now capable of handling two regions, i.e., the portion between contact 24 and the center line of layer 14, hereinafter called the first region and the portion between contact 26 and the center line of layer 14, hereinafter called the second region. The first region and the second region may be scanned simultaneously or at separate times.

In the discussion of the described embodiments the radiation beams 54 and 56 were presumed to be constantly directed onto the upper semiconductor layer 14. In applications where it is possible to control the mode of radiation (this is the case in most scanner applications) it is more desirable in the present invention to have the radiation beam intermittent and to flash on at given times. In such instance the waveforms from the Y waveform generator 28 and the X waveform generator 20 will have to be synchronized with the flashing period of the radiation beam.

In FIG. 2, presume that the radiation beams 54 and 56 of FIG. 1 are momentarily flashed on at times $t_0$, $t_4$, $t_8$, $t_{12}$, $t_{16}$, etc. A waveform $Y_2$ will be provided to sweep the resultant minority carriers in the Y direction. At the end of the first $Y_2$ pulse the $X_2$ pulse sweeps the minority carriers in its X direction. The first $X_2$ pulse ends at $t_2$, after which no further radiation is directed onto the upper semiconductor layer until $t_4$. Thus, between $t_2$ and $t_4$ the previous minority carriers are permitted to decay so there will be no possible interference between minority carriers swept by different pulses at different times.

The discussion thus far has also been directed to radiation beams which are directed to discrete spots on the surface of the upper layer 14. It will be appreciated by one skilled in the art that radiation in the form of lines, patterns and areas may also be scanned. In the embodiment of FIG. 1 the middle layer 12 is contiguous with the outer layers 10 and 14 throughout their entire lengths. Thus, minority carriers produced by radiation beams in the form of lines, patterns, etc. when swept in the X direction, will result in a representative continuous output signal. In the embodiment of FIGS. 3 and 4, however, the bodies of P conductivity are in the form of discrete dots and the X scan of a line or pattern of minority carriers will be discontinuous and the resultant output signal will be composed of a plurality of separate pulses. In some instances it may be desirable to maintain such output pulses, however, if a continuous output signal more representative of the radiation pattern is desired, a smoothing or integrating circuit may be included in detector circuit 35.

It might also be mentioned that the waveforms in FIG. 2 are idealized, particularly waveform A. The waveform A represents the output signal which is ultimately produced by the Y and X scanning of the minority carriers produced by the radiant energy. It is known that the number of minority carriers so produced is a function of the intensity of the radiant energy, and that they decay with time. Thus, the output pulses produced by various radiant energy sources directed at separate points on the scanner will result in output pulses of varied amplitude however, it is not the amplitude of the output pulses which determine the position the radiant energy, but it is the position of the output pulses with respect to the Y and X waveform time bases.

While the invention has been particularly shown and described with reference to preferred embodiments thereof, it will be understood by those skilled in the art that various changes in form and details may be made therein without departing from the spirit and scope of the invention.

What is claimed is:

1. A radiation detection and scanning device comprising:

a first semiconductor body adapted to receive input radiation, said first semiconductor body being adapted to release free carriers in response to said input radiation;

a second semiconductor body joined to a given portion of said first semiconductor body;

means for applying a first scanning signal to said first semiconductor body to drive said free carriers toward said second semiconductor body;

and means for applying a second scanning signal to said second semiconductor body for producing an output pulse in response to scanning said free carriers.

2. The device set forth in claim 1, wherein said first semiconductor body is adapted to produce localized packets of minority carriers in response to said input radiation, the concentration of said minority carriers at any point in said semiconductor body being a function of the radiation input rate at that point.

3. The device set forth in claim 1, wherein said first scanning signal means is adapted to produce a substantially rectangular scanning voltage pulse of predetermined amplitude and predetermined pulse width.

4. The device set forth in claim 1, wherein said second semiconductor body includes semiconductor material which is opposite in conductivity type from the material in said first semiconductor body and semiconductor material which is the same conductivity type as said first semiconductor body, and wherein said first and second semiconductor bodies are joined together to form at least one P-N collector junction.

5. The device set forth in claim 1, wherein said input radiation is applied to said first semiconductor body at at least one point.

6. The device set forth in claim 1, wherein said input radiation is applied to said first semiconductor body in a linear pattern.

7. A radiation scanning device comprising:

a first body of semiconductor material adapted to receive radiant energy, said radiant energy producing free carriers in said first semiconductor body in the vicinity of said radiant energy;

a second semiconductor body joined to said first semiconductor body to form an essentially linear junction;

means for applying a first scanning signal to said first semiconductor body between the vicinity of said essentially linear junction and a vicinity remote from and transverse to said essentially linear junction, said first scanning signal causing free carriers located between said first scanning signal to be moved to the vicinity of said essentially linear junction;

means for applying a second scanning signal to said second semiconductor body between the extreme ends of said essentially linear junction for detecting functions of the position of said free carriers with respect to said essentially linear junction.

8. A device as set forth in claim 7, wherein said first scanning signal is in the form of a sequence of separate pulses, each having a separate amplitude, and wherein each pulse is adapted to move free carriers in separate linear vicinities to the vicinity of said essentially linear junction.

9. A device as set forth in claim 8, wherein said second scanning signal is in the form of a sequence of separate pulses occurring in time between said pulses of said first scanning signal, and wherein each of said second scanning pulses will produce an output pulse in response to free carriers moved by the immediately preceding one of said first scanning pulses.

10. A radiation scanning and detection device comprising:

a three layer semiconductor body including a center layer having a conductivity type opposite to the conductivity type of the first and second outer semiconductor layers and wherein the center layer and a first one of said outer layers have approximately the same dimensions and wherein the second one of said outer layers is elongated in a given direction with respect to the other two layers, and wherein said elongated semiconductor layer is adapted to release free carriers in response to input radiation directed thereon;

means for applying a first scanning signal across said elongated semiconductor layer in said elongated direction to drive said free carriers to a position proximate said middle semiconductor layer;

means for applying a second scanning signal across said first one of said outer semiconductor layers, said second scanning signal causing said free carriers in said first semiconductor layer proximate said middle layer to produce output pulses.

11. A device as set forth in claim 10, wherein said first scanning signal is composed of a repetitive sequence of increasingly smaller amplitude pulses, each pulse adapted to drive in said elongated direction any free carriers located in a separate linear portion of said first outer semiconductor layer, each of said separate linear portions being at right angles to said elongated direction.

12. A device as set forth in claim 10, wherein said second scanning signal is composed of a sequence of sawtooth waves, each amplitude value of said sawtooth wave causing free carriers located at separate points in a linear portion or said first outer semiconductor layer proximate to said center semiconductor layer to produce separate output pulses.

13. A radiation scanning and detection device comprising:

a three layer semiconductor body including a center layer composed of a plurality of separate dot shaped semiconductor material having a conductivity type opposite to the conductivity type of the first and second outer semiconductor layers and wherein the center layer and a first one of said outer layers have approximately the same dimensions and wherein the second one of said outer layers is elongated in a given direction with respect to the other two layers, and wherein said elongated semiconductor layer is adapted to release free carriers in response to input radiation directed thereon;

means for applying a first scanning signal across said elongated semiconductor layer in said elongated direction to drive said free carriers to a position proximate said middle semiconductor layer;

means for applying a second scanning signal across said second one of said outer semiconductor layers, said second scanning signal causing said free carriers in said first semiconductor layer proximate said middle layer to produce output pulses.

14. A device as set forth in claim 13, wherein said first scanning signal is composed of a repetitive sequence of increasingly smaller amplitude pulses, each pulse adapted to drive in said elongated direction any free carriers located in a separate linear portion of said first outer semiconductor layer, each of said separate linear portions being at right angles to said elongated direction.

15. A device as set forth in claim 13, wherein said second scanning signal is composed of a sequence of sawtooth waves, each amplitude value of said sawtooth wave causing free carriers located at separate points in a linear portion of said first outer semiconductor layer proximate to said center semiconductor layer to produce separate output pulses.

16. A radiation scanning and detection device comprising:

a three layer semiconductor body including a center layer having a conductivity type opposite to the conductivity type of the first and second outer layers and wherein the center layer and a first one of said outer layers have approximately the same dimensions and wherein the second one of said outer layers is elongated in a given direction with respect to the other two layers such that said middle and second outer layers is equidistant from the elongated ends of said first semiconductor layer, and wherein said elongated semiconductor layer is adapted to release free carriers in response to input radiation directed thereon;

means for applying a first scanning signal across said elongated semiconductor layer in said elongated direction to drive said free carriers to a position proximate said middle semiconductor layer;

means for applying a second scanning signal across said second one of said outer semiconductor layers, said second scanning signal causing said free carriers to produce an output pulse.

17. A device as set forth in claim 16, wherein said means for applying a first scanning signal includes a first waveform generator coupled to one elongated end of said first outer semiconductor layer for applying a scanning signal between said one elongated end and said middle and second outer semiconductor layers;

and a second waveform generator coupled to the other elongated end of said first outer semiconductor layer for applying a scanning signal between said other elongated end and said middle and second outer semiconductor layers.

References Cited

UNITED STATES PATENTS

| | | | |
|---|---|---|---|
| 3,111,556 | 11/1963 | Knoll et al. | 178—7.1 |
| 3,317,733 | 5/1967 | Horton et al. | 250—211 |

RALPH G. NILSON, *Primary Examiner.*

M. ABRAMSON, *Assistant Examiner.*